Nov. 5, 1957  G. C. MAYFIELD  2,811,762
PROCESS FOR MOLDING PISTON RINGS
Filed Oct. 18, 1952  3 Sheets-Sheet 1

INVENTOR
GEORGE C. MAYFIELD
By Brumyn and Sutherland
ATTORNEYS.

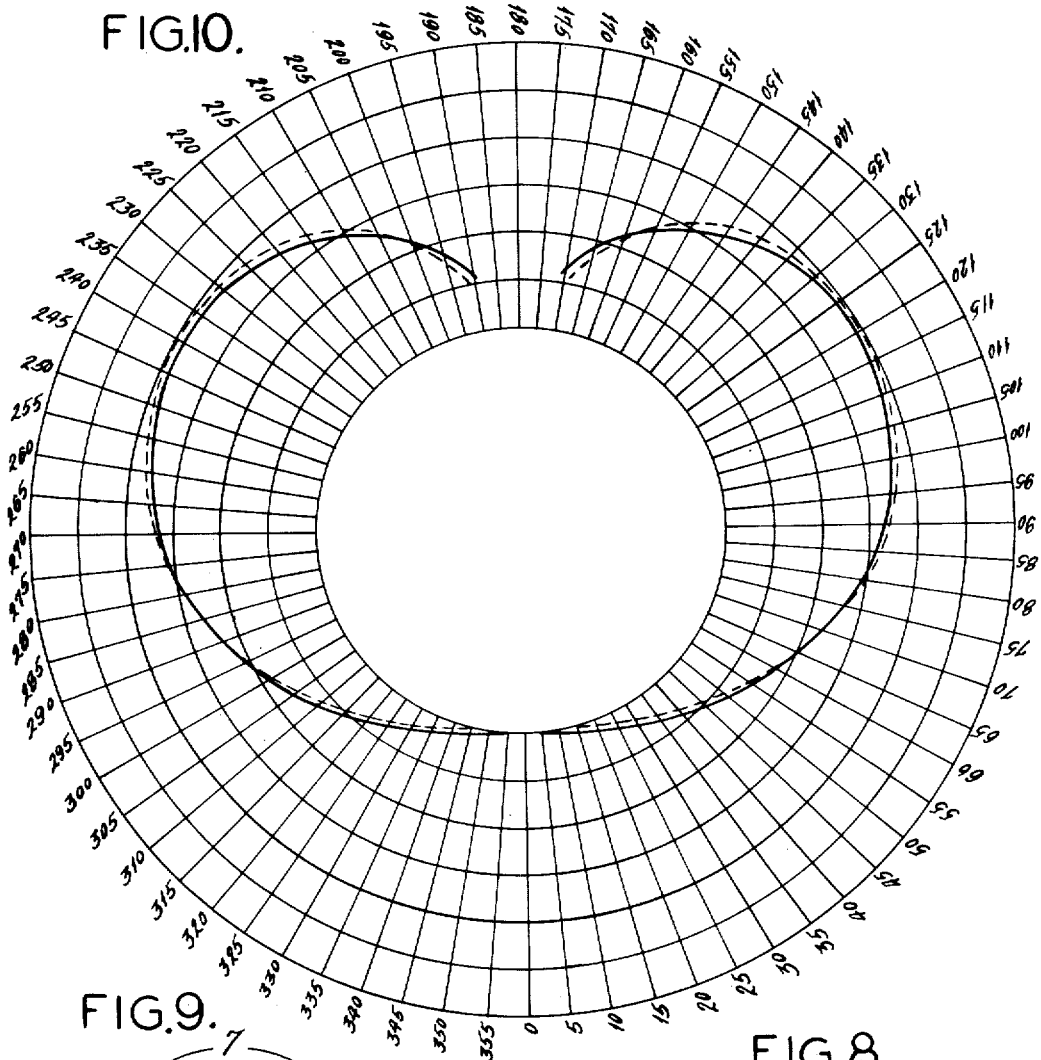
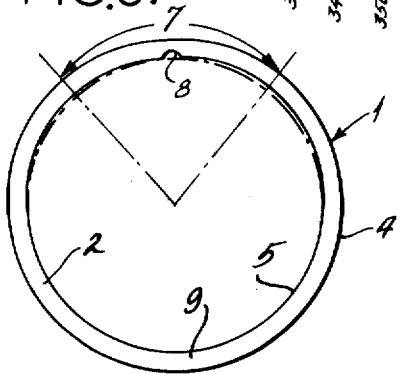
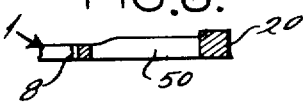

United States Patent Office 2,811,762
Patented Nov. 5, 1957

2,811,762

PROCESS FOR MOLDING PISTON RINGS

George C. Mayfield, Richmond Heights, Mo., assignor to McQuay-Norris Manufacturing Company, St. Louis, Mo., a corporation of Delaware Application October 18, 1952, Serial No. 315,492

1 Claim. (Cl. 22—212)

This invention relates to piston rings and piston ring castings and process and apparatus for their manufacture.

In the production of plain, one-piece rings for internal combustion engines, there are certain steps followed by almost every manufacturer: Form-turned pattern rings are made; these rings, together with sprues and gates, are mounted on a flat plate; a stack mold of green sand is made by repeated use of the pattern; a cast iron "tree" of rings on a central sprue is cast in the mold; the rings are broken from the tree, cleaned (rattled) and inspected; the rings are roughed out by gate grinding (to knock off burrs at the gate), inside burring (removing scale and fins from the back of the ring), outside burring (removing scale and fins from the face of the ring) and rough discing (removing scale from the sides of the ring); they are given a final discing (to finish the sides); they are split to form a gap at the gate side of the ring (the cuts being symmetrical about the gate); a number of the rings are placed centrally on an arbor, are mechanically closed, and held on the arbor by end pressure, and the rings on the arbor are first rough-turned and then given a final turning in a lathe; the end pressure is relieved and the rings are then removed from the arbor and forced into a sleeve which is dimensioned to close the rings, and the rings in the sleeve are bored to size; a final size split is made; the rings are finally inspected and packed.

Desirably a finished ring to be used in a round cylinder should be as nearly round as possible under operating condition. It can be seen that, since the rings, the steps of of the free ends of the ring do not bear against the cylinder wall. To this end, the shape of the ring should approach that of a cardioid when the ring is in its relaxed condition. It can be seen, since the rings, the steps of the production of which were described above, are turned round on an arbor and are bored round in a sleeve, any deviation from the round in the relaxed condition of the rings must result from the original configuration and condition of the ring as cast.

The practice in casting such a ring has heretofore generally been to provide a mold with a simple ring cavity with a single gate for each ring, located diametrically opposite the heel of the ring. The ring patterns from which the mold is made are cammed to substantially a cardioid shape. However, it is found that rings cast in such a mold are distorted at the gate, departing outwardly therefrom the desired shape. When the rings are subsequently split about the gate section, the free ends of the ring retain the out-turning tendency.

If the pattern is cammed to attempt to compensate for that departure, it is found that some other portion of the ring will accordingly be distorted. In either case, there is a difference in hardness and microstructure of the ring from one point to another in rings so cast, even after the rings are split. The ends of rings of the character described, used in such installations as two-cycle outboard engines are liable to catch in the ports of the cylinder, either breaking the ring or scouring the cylinder, unless they are pinned.

One of the objects of this invention is to provide cast rings which are uniformly of a desired configuration.

Another object is to provide such rings which have uniform microstructure and hardness.

Another object is to provide process and apparatus for producing such rings.

Other objects will become apparent to those skilled in the art in the light of the following disclosure and accompanying drawing.

In accordance with this invention, generally stated, a piston ring, having a gate section and a heel, is cast in a green sand mold with a pair of heat reservoirs symmetrically arranged about and at a narrowly limited angular distance from the region which is to be the gap section. The heat reservoirs are so located as to produce a ring of substantially uniformly desired shape. In order to assure a uniform hardness and microstructure throughout the ring, the heat reservoirs are peculiarly proportioned as is hereafter described.

In the drawings:

Figure 8 is a sectional view taken along the line 8—8 of Figure 7;

Figure 9 is a plan view of a piston ring of this invention before it is split, the broken lines indicating its relation to the original ring pattern;

Figure 11:
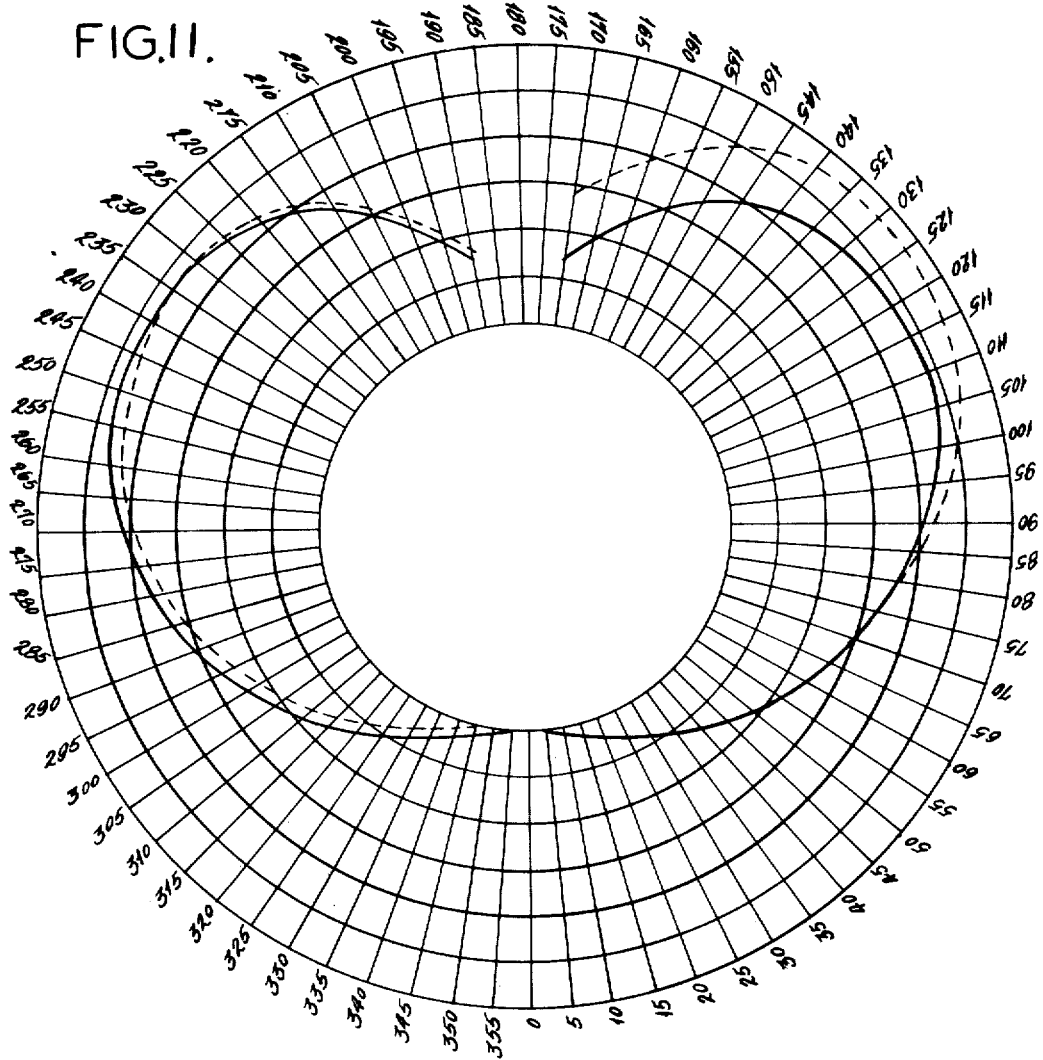

Figure 10 is a polar chart successive radial coordinates of which represent increments of .005 inch, the angular coordinates of which are in degrees, on which the solid line represents the shape of a theoretically ideal piston ring, substantially a cardioid, and the dotted line represents the shape of a typical finished piston ring of this invention; and Figure 11 is a polar chart having the same coordinates as the chart of Figure 10, whereon the solid line represents substantially a cardioid, identical with that shown in Figure 10, and the dotted lines represent the shape of a typical finished piston ring known heretofore.

Referring now to Figure 9 of the drawings, 1 represents an unsplit piston ring made in accordance with this invention. In common with all piston rings of the general type shown the ring 1 has an upper side 2, a lower side 3 (Fig. 5), a face 4, a back 5, a gate section 7 embracing an arc of between 60° and 120°, and a heel 9.

Figure 3:
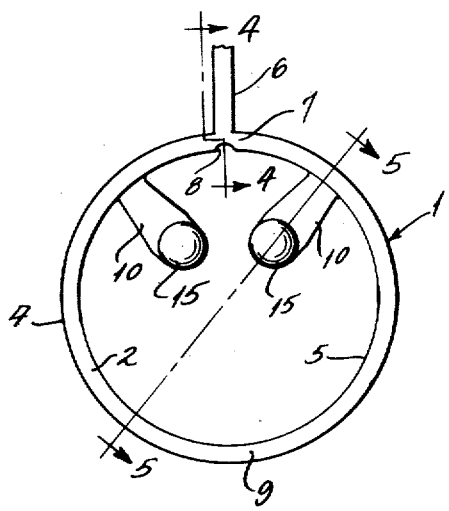
Figure 3 is a plan view of an individual ring casting and its associated parts from the pattern of Figure 1.
Figure 4:
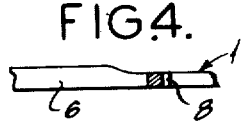
Figure 4 is a sectional view taken along the line 4—4 of Figure 3.
Figure 5:
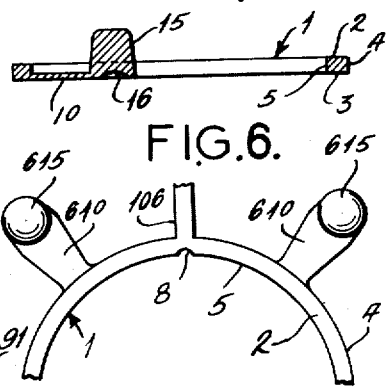
Figure 5 is a sectional view taken along the line 5—5 of Figure 3.

Referring now to Figure 3 for one illustrative embodiment of this invention, a piston ring casting is shown, being the piston ring 1 in its "as cast" condition. In this embodiment a gate 6 is integral with the center of the gate section 7 of the ring 1. The center of the gate section 7 is marked by a notch 8. Diametrically opposite the center of the gate section 7 of the ring is the heel 9 of the ring. Symmetrically arranged about the center of the gate section 7 and integral with the back 5 of the ring are two inwardly radially extending runners 10. The runners 10 are of substantial breadth, measured circumferentially of the ring. The center of the area of connection of the runners 10 to the back 5 of the ring is at an annular distance of approximately 40° from the center of the gate section 7 of the ring. Integral with the inner end of each runner 10 is a thimble-shaped riser 15. A sectional view of a runner 10 and riser 15 is shown in Figure 5. As shown in that figure, the riser 15 has a dimple 16 in its lower surface. As can also be seen from that figure the width of the runner 10 measured axially of the ring 1 is relatively small. In the illustrative embodiment shown the width of the ring is approximately 3.2 times the width of the runner 10. On the other hand the radial thickness of the ring is approximately .61 times the breadth of the runners 10 at their area of connection so that the cross-sectional area of the ring is approximately twice that of the runners. As an illustrative example, for a ring approximately .113 inch in width (as cast), .143 inch in thickness (as cast) and approximately 2½ inches in diameter, the width of the runner is .035 and its breadth at its point of connection with the ring is .235 inch, and the riser 15 is ⅜ of an inch high and has a base diameter of ⅜ inch. The weight of the cast ring (unsplit but without the runners and risers) is approximately 3.2 times the combined weight of one riser and runner. That is to say, a pair of risers and runners as shown in Figure 3 contains approximately 0.63 times as much metal by weight as the ring. At the same time the ratio of weight of runners to that of risers is approximately 0.14 to 1. The paired runners 10 and risers 15 constitute the heat reservoirs of this embodiment.

Figure 1:
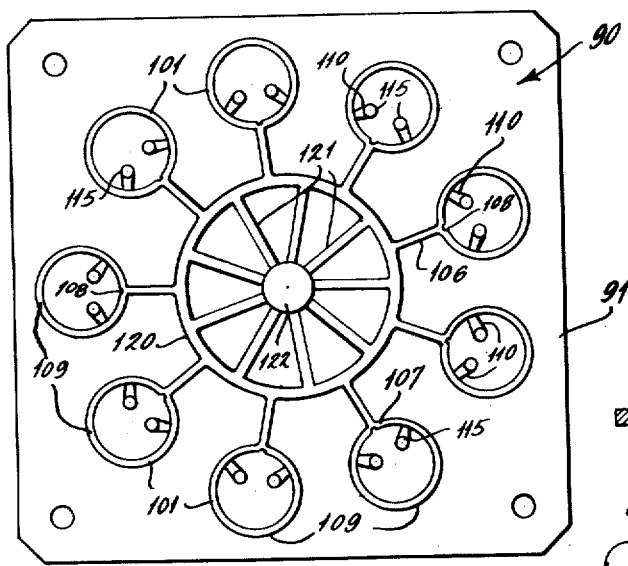
Figure 1 is a plan view of a pattern constructed in accordance with one embodiment of this invention.
Figure 2:
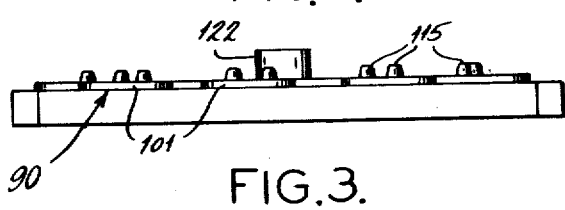
Figure 2 is a view in side elevation of the pattern shown in Figure 1.

Figures 1 and 2 show a pattern 90 from which the ring of Figure 3 is produced. The pattern 90 is mounted on a pattern plate 91. The pattern 90 consists of a series of ring patterns 101. The ring patterns 101 are provided with parts corresponding exactly with the parts of the ring shown in Figure 3, but the parts of the ring pattern 101 are dimensioned to allow for the shrinkage of the metal of which the piston ring is made as the metal passes from the molten to its cool, solidified state. Thus the piston ring pattern 101 has a heel 109, a gate section 107, the center of which is marked by a notch 108, and a pair of inwardly radially extending runners 110 arranged symmetrically about the center of the gate section 107 and provided with risers 115. A gate 106 is integral at one end with the gate section 107 of the ring 101 and at the other end with a distributing circle 120. A series of spokes 121 run radially between the distributing circle 120 and a central sprue 122. The height of the central sprue 122 is such as to extend through a mold made from the pattern 90 to provide a passage from the top of a stack of such molds to the bottom thereof. The pattern 90 is mounted flat on the pattern plate 91 so that no provision is made in the pattern for the dimple 16, in the risers 15.

Figure 6:
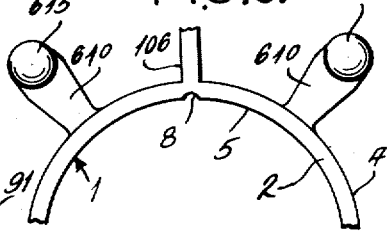
Figure 6 is a fragmentary plan view of a casting of another embodiment of this invention.

The elements and proportions of the embodiment of casting shown in Figure 6 are identical with those of the embodiment shown in Figures 1–5, and are given corresponding numerical designations, with the prefix 6. The difference between the two embodiments is that the paired heat reservoirs extend radially outwardly instead of inwardly, the runners being integral with the face of the ring rather than with the back thereof.

Figure 7:
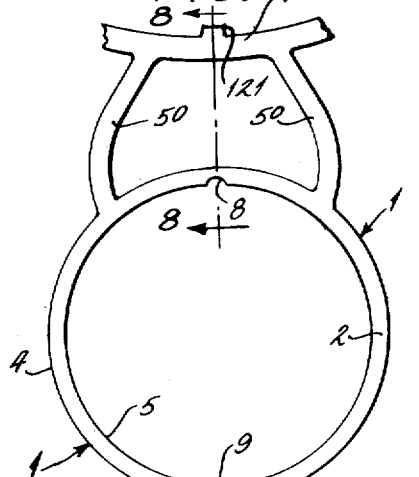
Figure 7 is a fragmentary plan view of a casting of still another embodiment of this invention.

In the embodiment of piston ring shown in Figures 7 and 8 the piston ring 1 also has a heel 9 and a notch 8 marking the center of a gate section 7. However, instead of having a single gate 6 integral with the ring at the center of the gate section 7, the piston ring of Figures 7 and 8 is provided with a pair of feed gates 50 symmetrically arranged about the center of the gate section 7 and integral with the face of the ring at an angular distance from the center of the gate section of approximately 40°. The cross-sectional area of each of the feed gates is, in the embodiment shown, no greater than the cross-sectional area of the ring. In this embodiment, the feed gates 50 constitute the heat reservoirs.

A pattern from which the piston ring of the embodiment shown in Figures 7 and 8 is made has a central sprue, radially extending spokes and distributing circle like those of the pattern 90 shown in Figure 1, and is mounted as is pattern 90 on a pattern plate. From the distributing circle, however, two feed gates extend to connect with the piston ring 1 in the way in which feed gates 50 shown in Figures 7 and 8 do. It can be seen, however, that a single gate extending from the distributing circle toward the ring can be split before it reaches the ring to form two feed gates of the character of feed gates 50, which arrangement makes for a somewhat cleaner casting.

In producing a ring of this invention, a pattern, mounted on its pattern plate, is used to make a green sand mold in accordance with established foundry practice. In a modern foundry, the plate is placed on the stand of a molding machine, a flask is placed on the plate, green sand is put in the flask, and the sand is compacted around the pattern by rapid vibration of the stand. A number of such molds are stacked together, the upper surface of successive molds forming the bottom wall of the mold above.

Molten metal, generally cast iron, is poured into the central sprue cavity formed by the sprue 122 of the pattern, and the metal flows through the spoke passages formed by the spokes 121 to the distributing circle passage formed by the distributing circle 120.

When a pattern of the character shown in Figures 1 and 2 is used (or a corresponding pattern from which the embodiment shown in Figure 6 is made), the metal flows from the distributing circle passage through the gate passages formed by the gate 106, into the ring cavities produced by the ring pattern 101 and, through the runner passages formed by the runners 110, into the riser cavities produced by the risers 115. In this embodiment, it would appear that the risers 15 should act as anchors to restrain any tendency for the ring casting to depart outwardly in the ring cavity. This is not the case, however, but quite the contrary. It is thought that the heat reservoirs ensure that the area of the casting at which they are connected cool more slowly than the remainder of the ring casting; that is to say, the cooling of the metal in the mold cavity is retarded by the retained heat of the runners and risers, as compared with the cooling of the remainder of the metal in the mold cavity. Any movement of the ring 1 after the metal of the risers 15 and/or runners 10 has set is thought simply to move the risers 15 in the mold. It is to allow this movement that green sand or its equivalent is used. The term "green sand" is used in the specification and claims to embrace equivalent materials which permit this movement, in contradistinction to such materials as plaster and to baked molds of various sorts. In any event, and the theory of its production forms no part of this invention, the ring resulting from this arrangement departs outwardly very slightly but uniformly in the areas at which the runners 10 are connected, and shows no outward departure whatsoever at the gate section 7. This is clearly shown in Figure 9.

It might further be assumed that, if the risers 15 and runners 10 act as heat reservoirs to slow the cooling of the area at which they are connected, the hardness and microstructure of the ring would vary from the heel, where the metal chills quickly, to the gate area. Again, however, this is not the case. The Rockwell B hardness of the casting at the areas at which the runners are connected varies no more than two points from the hardness at any other point along the casting. The dimensions of the runners 10 are thought to be important in producing a uniform hardness. In a typical cast iron ring of this invention, with the "as cast" dimensions described (2½" O. D., .143" thick, .113" wide) with runners of uniform width (.035"), the runners flaring from a breadth at the back of the ring of .235" to a breadth of ⅜" at the riser, with a riser ⅜" in diameter at the base and ⅜" high with a slight upward taper, each runner and riser having a radial length of approximately ¼", the Rockwell B hardness of the ring from the heel to the edge of the gate section at which the ring is slit varies from 100 to 102, whereas the Rockwell B hardness of a typical single-gate ring of the character known heretofore varies from 97 to 104. As has been pointed out above, in the illustrative embodiment, the ratio of the cross-sectional areas of the ring to runners is approximately 2 to 1 and the ratio of ring weight to total runner and riser weight is approximately 1.6 to 1, while the ratio of riser weight to runner weight is approximately 7 to 1.

Under the circumstances described, the microstructure as well as the hardness of the ring of this invention is substantially uniform.

In casting a piston ring in accordance with the embodiment of this invention shown in Figures 7 and 8, the casting metal is again poured through the central sprue into stacked green sand molds. The metal flows through the spoke passages to the distributing circle passage, thence through the feed gate passages into the ring cavity.

In any embodiment, the positioning of the paired heat reservoirs (the runners and risers of the embodiments shown in Figures 1-6, and the feed gates in the embodiment shown in Figures 7 and 8) is of paramount importance. The center of the area of connection of the paired heat reservoirs to the ring is preferably at 40° from the center of the gate section of the ring, marked by notch 8. However, improved results over the rings known heretofore are obtained when the runners or feed gates are positioned between 30° and 60° from the center of the gate section. The term "feed channels" is used hereafter to include both runners and feed gates.

The embodiment of the invention shown in Figures 7 and 8 produces a finished ring which is much more uniformly of the desired shape than the single-gated rings known heretofore. However, the hardness and microstructure of the rings of this embodiment are not as uniform as those of the remaining embodiments of this invention.

Piston rings made in accordance with the embodiments of this invention illustrated in Figures 1-6 are not only more nearly uniform in shape, but in hardness and microstructure than piston rings known heretofore.

The finished rings of all embodiments of this invention provide a greater degree of light tightness in a cylinder, and have less tendency to stick in ports in a cylinder than round turned and bored rings known heretofore because not only do they conform more rigorously to the desired cardioid shape but the ends of the ring have a tendency to depart slightly inwardly rather than outwardly as shown in Figure 10.

Numerous variations in the process, apparatus and manufactures of this invention within the scope of the claim will occur to those skilled in the art in the light of the foregoing description. For example, the shape of the runners and risers may be varied, and their position axially (but not circumferentially) of the ring; the arrangement of the spokes and distributing circle of the pattern may be varied; or in the embodiment wherein a pair of feed gates meets the face of the ring, the cross-sectional area of the paired feed gates may be reduced.

Thus it can be seen that a simple solution is provided to a problem which has vexed the piston ring art since its inception.

Having thus described my invention what is claimed and desired to be secured by Letters Patent is:

The process of producing a piston ring comprising forming in a green sand mold a ring cavity having a gate section, and forming two restricted feed channels connected directly to said ring cavity at points symmetrically arranged on opposite sides of said gate section and located within an angular arc between 30° and 60° from the center of said gate section, measured from the center of the ring mold and within the same plane; feeding molten metal into said ring cavity and said feed channels; cooling the metal in the ring cavity while supplying heat and metal to said feed channels as the metal in the ring cavity solidifies whereby the cooling of the metal in the ring cavity is retarded at the two points at which the feed channels are connected thereto; and splitting the cast ring at the gate section.

References Cited in the file of this patent

UNITED STATES PATENTS

| | | |
|---|---|---|
| 2,101,046 | Blettner | Dec. 7, 1937 |
| 2,401,075 | Humes | May 28, 1946 |
| 2,509,154 | Leisk | May 23, 1950 |
| 2,594,998 | Rocco | Apr. 29, 1952 |
| 2,621,381 | Johnson | Dec. 16, 1952 |
| 2,621,382 | Johnson | Dec. 16, 1952 |

FOREIGN PATENTS

| | | |
|---|---|---|
| 619,991 | Great Britain | Mar. 17, 1949 |
| 956,146 | France | July 18, 1949 |

OTHER REFERENCES

Modern Foundry Practice, E. D. Howard, rec'd in Patent Office Oct. 2, 1945. Page 263 relied on.

Feeding Castings, Oct. 1947, Figure 3, page 55 relied on. "American Foundryman."

UNITED STATES PATENT OFFICE

CERTIFICATE OF CORRECTION

Patent No. 2,811,762            November 5, 1957

George C. Mayfield

It is hereby certified that error appears in the printed specification of the above numbered patent requiring correction and that the said Letters Patent should read as corrected below.

Column 1, line 43, strike out "condition. It can be seen that, since the rings, the steps of" and insert instead --conditions, and should be so formed that the corners--.

Signed and sealed this 14th day of January 1958.

(SEAL)
Attest:
KARL H. AXLINE

Attesting Officer

ROBERT C. WATSON
Commissioner of Patents